(No Model.)  3 Sheets—Sheet 1.

C. REUTHER.
AUTOMATIC GRAIN WEIGHING MACHINE.

No. 323,533.  Patented Aug. 4, 1885.

Witnesses:
Charles R. Searle.
J. E. Rennie.

Inventor:
Carl Reuther
By his attorney
Thomas Drew Stetson (No Model.) 3 Sheets—Sheet 2.

C. REUTHER.
AUTOMATIC GRAIN WEIGHING MACHINE.

No. 323,533. Patented Aug. 4, 1885.

(No Model.) 3 Sheets—Sheet 3.

C. REUTHER.
AUTOMATIC GRAIN WEIGHING MACHINE.

No. 323,533. Patented Aug. 4, 1885.

WITNESSES:

Carl Reuther INVENTOR

BY

ATTORNEY

UNITED STATES PATENT OFFICE.

CARL REUTHER, OF HENNEF, PRUSSIA, GERMANY.

AUTOMATIC GRAIN-WEIGHING MACHINE.

SPECIFICATION forming part of Letters Patent No. 323,533, dated August 4, 1885.

Application filed April 15, 1884. (No model.) Patented in Belgium December 15, 1883, No. 63,554, and in England January 11, 1884 No. 1,276.

*To all whom it may concern:*

Be it known that I, CARL REUTHER, a subject of the Emperor of Germany, residing at Hennef, Prussia, Germany, have invented certain new and useful Improvements in Automatic Balances for Fine-Grained and Pulverized Materials, and for Liquids, of which the following is a full, clear, and exact description.

Figure 1:
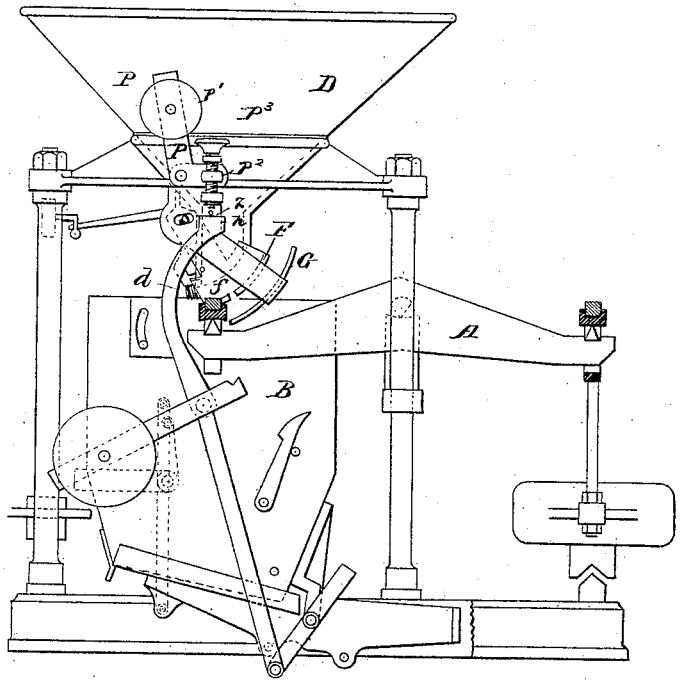

This invention is an improvement upon the device patented to me July 18, 1882, No. 261,257. To distinguish clearly what I deem to be new in this invention I have illustrated in Figure 1 the construction set forth in said patent, and in the remaining three figures the improvement thereon. According to that patent, (see Fig. 1,) the trap F was perforated and was adapted to close and shut off the volume of grain when the charge in the reservoir was nearly complete, and the grain slowly passed through the perforations until the traps G closed outside of the trap F and completely shut off the supply. This outer trap, G, was connected with a tumbling-bob or cramp-weight P $p$, the function of which was to control the first of the movement of the reservoir B in either direction. The receptacle B was loaded during the small supply through the openings $f$ in the trap F with the pressure exerted upon the cup $h$ by the knife-edge $z$. The beam A would consequently commence to sink on the receptacle side before having received the full charge, and this exactly as much sooner as corresponded to the adjustment made upon the cramp-weight. This adjustment was made by a screw, $p^3$, which passed through a nut, $p^2$, and allowed the weight $p'$ to be thrown more or less from a center of gravity.

In the present invention I do away with the trap G and employ a slide entirely separate from the cramp-weight, and instead of perforating the trap F, I perforate the brush $d$ and arrange the slide along its vertical side. I also provide for more or less resistance to be given the cramp-weight. These features are illustrated in the drawings, in which—

Figure 2:
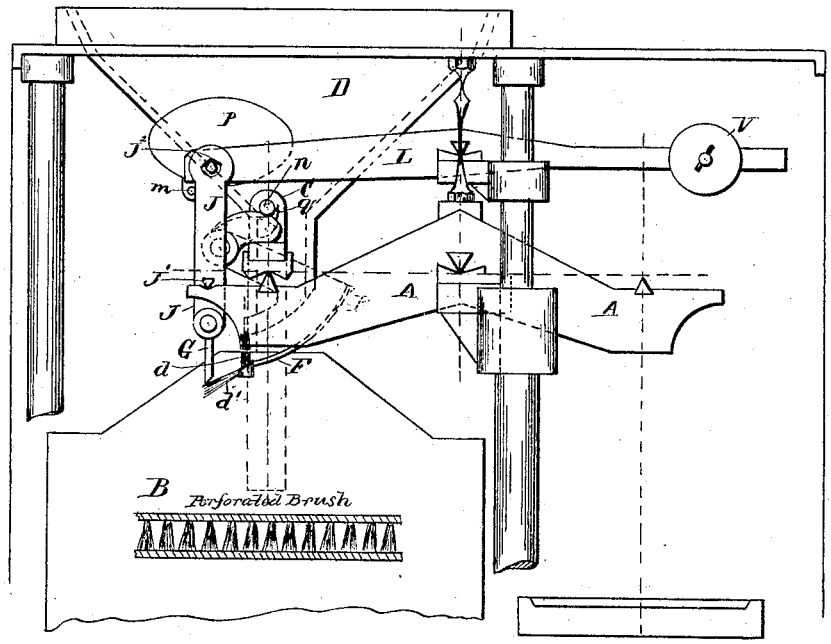
Figure 3:
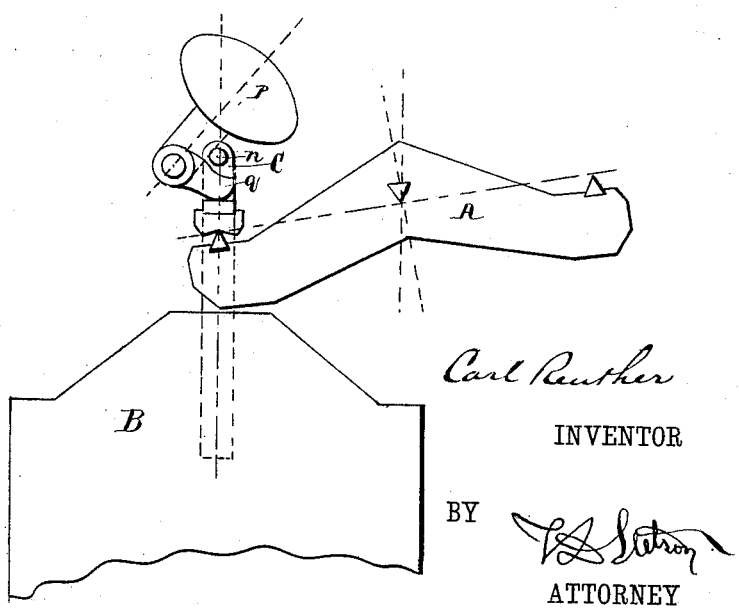

Fig. 2 is a side elevation with parts removed to show the new construction and arrangement with the weighing apparatus at rest. Fig. 3 is a detail view of portions, showing the action of parts when the receptacle is loaded and the beam tipped, and Fig. 4 a view of a modification of the means for adjustably weighting the cramp-weight.

Referring to the drawings, A designates the beam, B the receptacle, and C a vertical frame by which the said receptacle is suspended by a knife-edge from said beam. D designates the hopper, F the trap or cut-off, and $d$ the brush. These parts are substantially of the construction and arrangement shown in my patent hereinbefore mentioned, except that the trap F is imperforate, and that the necessary perforations for slow feed are transferred to the brush, which is arranged parallel with the track of a slide cut-off G, which acts against the inclined brush $d'$. This slide G is hung upon a vertical frame, J, which carries also a knife-edge, J', and has knife-edge connections $J^2$ with a weighted lever L, as shown. The frame J and slide G are arranged to travel with the receptacle end of the beam, and the weight V on the beam L serves to adjust the bearing on the beam A in the same manner that the devices $p^2 p^3$ served in the previous patent.

$p$ designates the cramp-weight, and it carries an arm, $q$, which rests under a lug or pin, $n$, on the frame C. In a condition of rest the said cramp-weight lies in contact with a stationary lug, $m$, upon the main frame, and when the frame C is depressed by reason of the weight of grain in the receptacle the pin $n$ depresses the arm $q$ until the weight has passed to the other side of the center of gravity, when the cramp-weight falls against the stop $n$ and remains in that position, as seen in Fig. 3, until, the grain having been automatically discharged from the receptacle by the devices shown in the previous patent, the frame C again rises and carries the cramp-weight over to its normal position. The pin $n$ is arranged at such distance from the arm $q$ that the cramp-weight will not be thrown until the slide G has completely closed. When the cramp-weight falls over to the right, the arm $q$ serves to force down the balance-beam, and this carries the receptacle with it.

Figure 4:
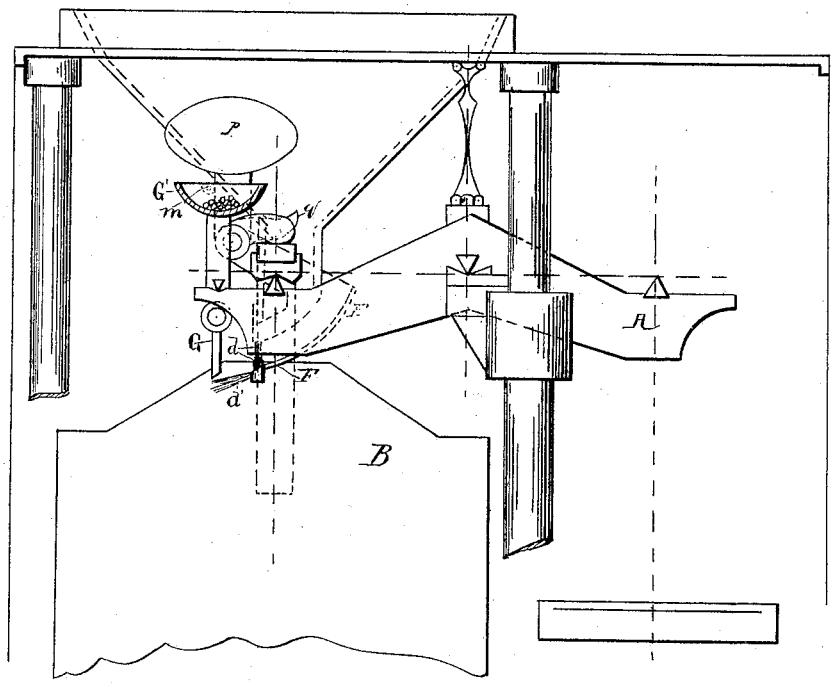

The pressure of the slide G and its supporting parts is partly compensated by the lever L and its adjustable weight. Instead of these devices, however, I may use a cup, G', and small weights, as shown in Fig. 4.

The improvements in this invention will be seen to consist, first, in the separation of the cut-off G from the cramp-weight; second, in perforating the brush d, providing a separate brush, d', and a sliding cut-off in connection therewith, and in closing the cut-off F.

What I claim as new is—

1. The combination, with the beam A, cut-off F, brushes d d', and slide G, of the balancing means L V, the cramp-weight, and their connections, all arranged and operating as and for the purposes set forth.

2. The receptacle B, beam A, perforated brush and cut-off, combined with the frame C, having lug n, the cramp-weight p q, slide G, brush d', lug m, and means, as L V, for adjusting the pressure on the beam, as set forth.

In testimony whereof I have hereunto set my hand, at Cologne, this 20th day of December, 1883, in the presence of two subscribing witnesses.

CARL REUTHER. [L. S.]

Witnesses:
 C. V. V. TRAPPENJ,
 EDUARD REISERT.